United States Patent [19]

Myers et al.

[11] Patent Number: 5,331,805
[45] Date of Patent: Jul. 26, 1994

[54] REDUCED DIAMETER ANNULAR COMBUSTOR

[75] Inventors: Geoffrey D. Myers, Phoenix; Manuel M. Cardenas, Jr., Scottsdale, both of Ariz.

[73] Assignee: AlliedSignal Inc., Morris Township, Morris County, N.J.

[21] Appl. No.: 52,417

[22] Filed: Apr. 22, 1993

[51] Int. Cl.5 .................................. F23R 3/14
[52] U.S. Cl. ........................... 60/39.36; 60/748
[58] Field of Search .............. 60/39.36, 756, 748, 60/740, 755, 752

[56] References Cited

U.S. PATENT DOCUMENTS

| 2,545,495 | 3/1951 | Sforzini | 60/756 |
| 2,867,982 | 1/1959 | Clarke et al. | 60/748 |
| 3,512,359 | 5/1970 | Pierce | 60/39.36 |
| 3,834,159 | 9/1974 | Vdoviak | 60/748 |
| 4,241,586 | 12/1980 | Caruel et al. | 60/756 |
| 4,689,961 | 9/1987 | Stratton | 60/748 |
| 4,843,825 | 7/1989 | Clark | 60/756 |
| 4,991,398 | 2/1991 | Clark et al. | 60/748 |
| 5,129,231 | 7/1992 | Becker et al. | 60/756 |

FOREIGN PATENT DOCUMENTS

| 0296058 | 12/1988 | European Pat. Off. | 60/748 |
| 802545 | 10/1958 | United Kingdom | 60/756 |

Primary Examiner—Richard A. Bertsch
Assistant Examiner—Timothy S. Thorpe
Attorney, Agent, or Firm—James W. McFarland; Robert A. Walsh

[57] ABSTRACT

An annular gas turbine engine combustor includes additional axial primary airflow openings, formed as arcuately segmented openings on opposite sides of each of the airblast fuel nozzles of the combustor, for reducing overall combustor diameter while maintaining flame stabilization and avoiding unacceptable thermal variations in the combustion process.

17 Claims, 3 Drawing Sheets

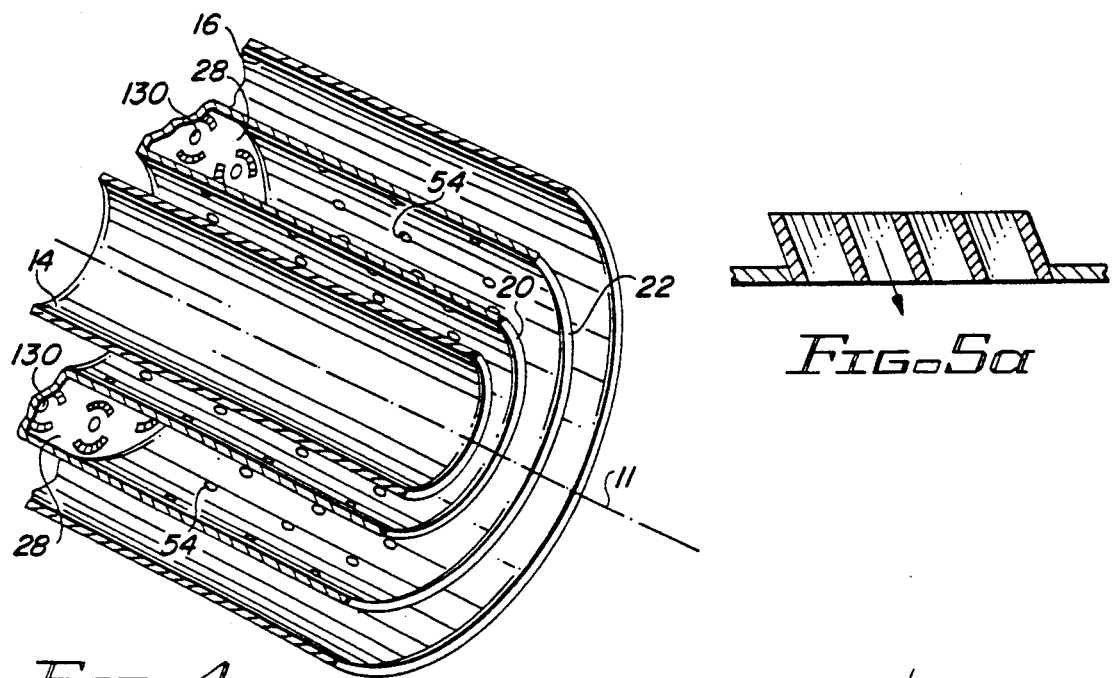
FIG-4
FIG-5a
FIG-5b
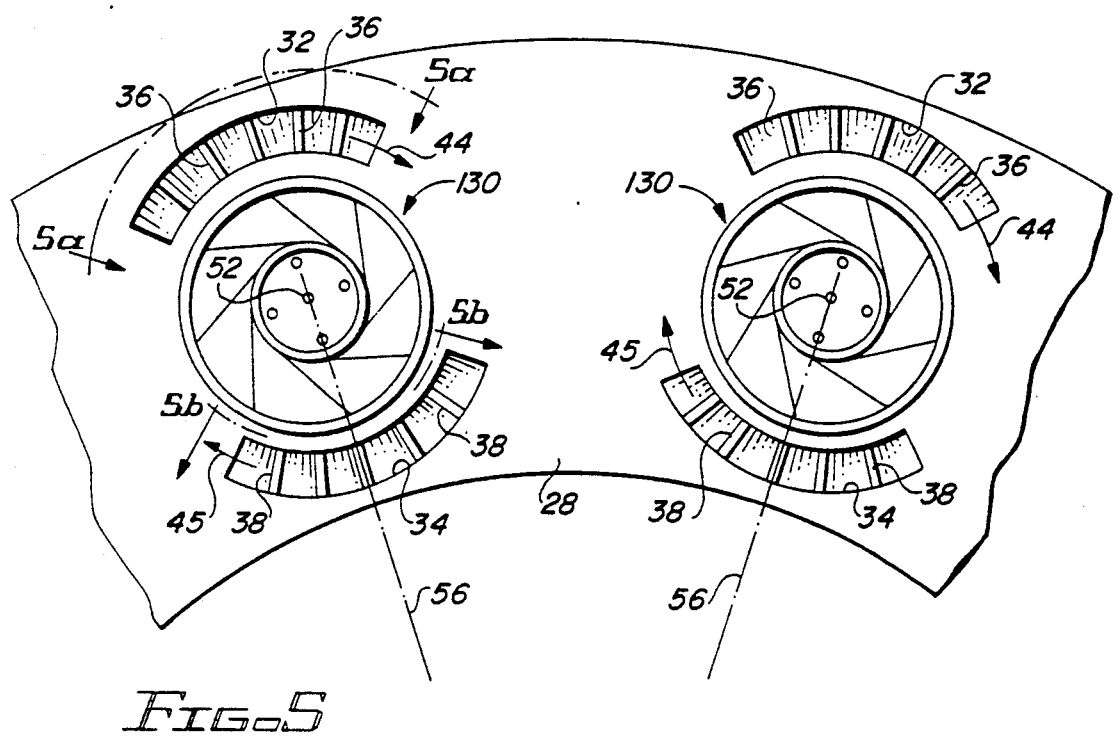
FIG-5

REDUCED DIAMETER ANNULAR COMBUSTOR

The United States Government has certain right in this invention in accord with F33615-87-C-2839 with the United States Air Force.

CROSS REFERENCE TO RELATED APPLICATION

Similar subject matter is disclosed in our co-pending U.S Pat. application No. 08/052,416 filed simultaneously herewith and having common assignee herewith, and which is incorporated herein by reference to the extent necessary for a full and complete understanding of the present invention.

TECHNICAL FIELD

This invention pertains to gas turbine engines and relates more particularly to an improved annular combustor construction of overall reduced diameter.

BACKGROUND OF THE INVENTION

Gas turbine engines often include an annularly shaped combustor disposed radially outwardly of the primary rotating components of the engine. As such, the outer diameter of the annular combustor is often a critical determinant of the overall diameter of the gas turbine engine. Smaller diameter engines are not only critical in certain applications, but in addition can impact overall aircraft operations by reduction in drag.

FIG. 1 illustrates a typical annular combustor of the prior art and has an annular combustor case with annular inner and outer casings 14a, 16a. Within the plenum or combustor case is a combustor liner comprising inner and outer, annularly shaped, perforated liners 20a, 22a. Pressurized air from the compressor suction of the engine is delivered through a diffuser 50a, and this pressurized air flow is split into a variety of flow paths into the combustion chamber 19a defined inside the combustor liner. A first portion of this airflow, approximately 23%, is delivered axially into the combustion chamber through a conventional airblast fuel nozzle 30a wherein fuel is finely atomized and initially mixed with the pressurized airflow. Outer annulus 15a carries approximately 20% of the airflow as primary airflow to support the combustion process, along with additional airflow that is introduced into the combustion chamber further downstream for purposes of cooling and dilution, as depicted by arrows 48a. Similarly, a portion of the pressurized airflow passes through the inner annulus 17a for delivery of primary airflow, comprising approximately 10% of the total air flow, along with additional downstream flow for cooling and dilution.

To carry the necessary airflow through the inner and outer annulus 17a, 15a without introducing unacceptable back pressure on the airflow, the overall combustor is sized with a outer radius $R_a$ from the engine centerline 11a. This overall diameter $R_a$ is thus directly impacted by the necessary sizing of the inner and outer annulus spaces 17a and 15a.

In many applications the quantity of axial airflow passing through the transverse endwall 28a at the dome end of the combustor liner is limited because of flame stabilization problems, inadequate mixing for efficient combustion processes, and excessive thermal variations in the gas flow being exhausted from the combustion chamber.

SUMMARY OF THE INVENTION

It is an important object of the present invention to provide an improved combustor for a gas turbine engine having a reduced overall diameter by virtue of increase of the axial flow into the combustor chamber, thereby reducing the airflow required through, and sizes of, the inner and outer annulur spaces between the combustor case and the combustor liner.

More particularly, the present invention contemplates introduction of arcuately segmented openings in the transverse dome wall for introducing primary airflow axially into the combustor chamber, but with vanes therein for creating a swirling flow surrounding each of the fuel nozzles in the primary zone of the combustion chamber. In this manner, axial flow of primary air is increased to reduce overall combustor size, but clean combustion is maintained without unacceptable thermal variations in the combustor or flame destabilization.

These and other objects and advantages of the present invention are specifically set forth in or will become apparent from the following detail description of a preferred form of the invention, when read in conjunction with the accompanying drawings.

BRIEF DESCRIPTIONS OF THE DRAWINGS

FIG. 4 is a schematic, perspective, unscaled, broken view of the combustor illustrating the annular configuration thereof;

FIG. 5 is an elevational view of a portion of the dome suction of the combustor liner as viewed along lines 5—5 of FIG. 3;

Figure 6:
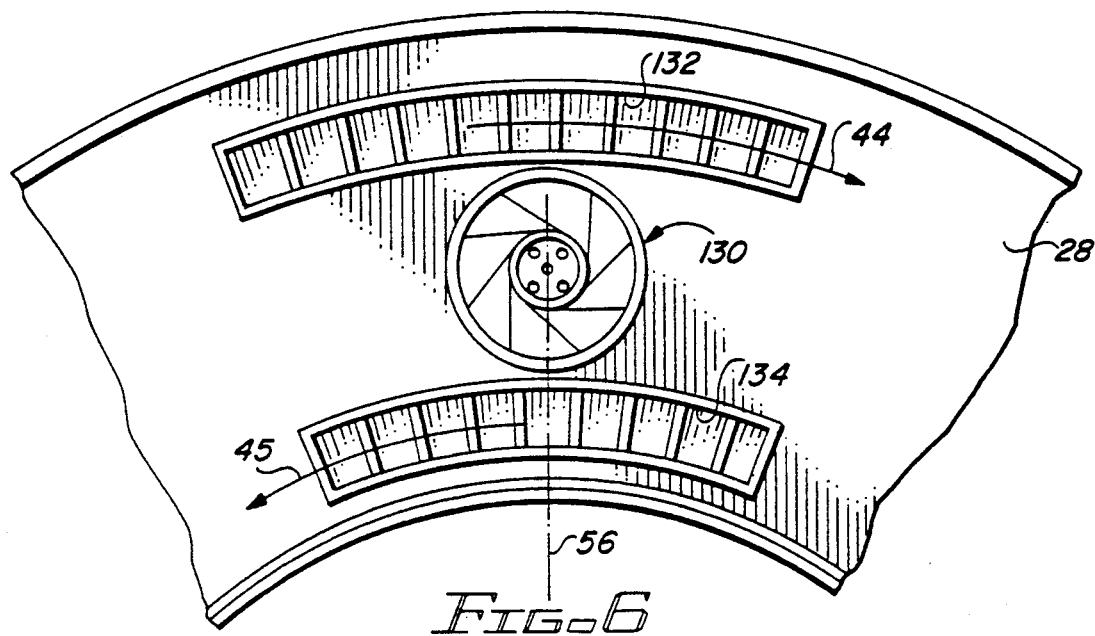
Figure 7:
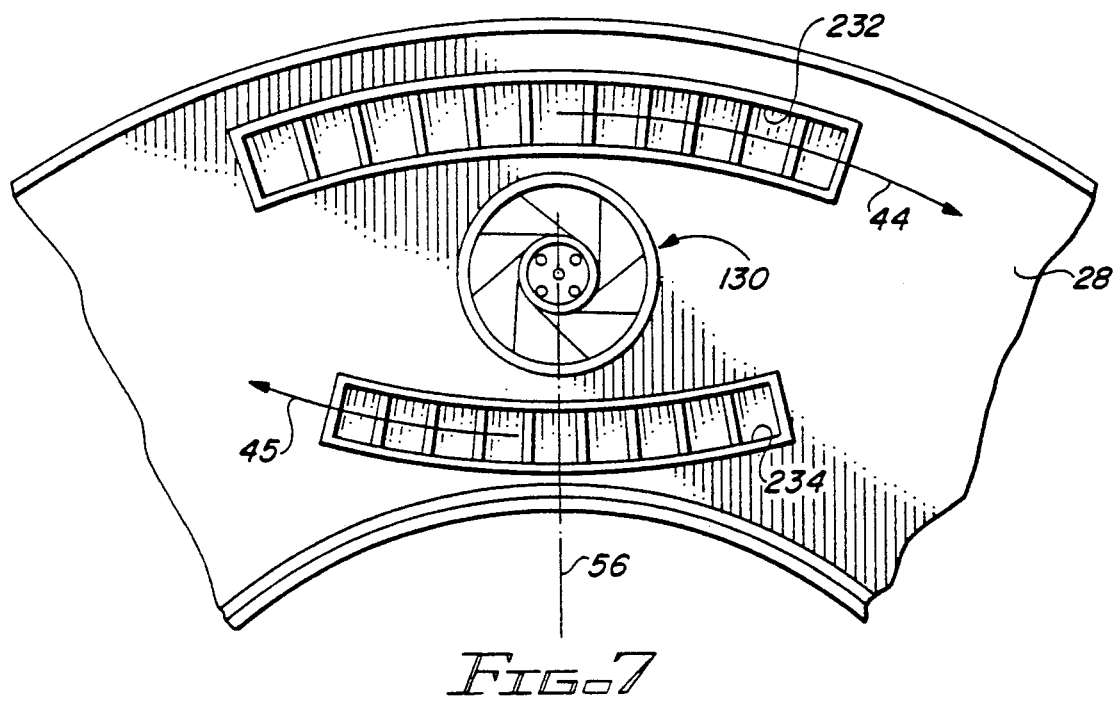

FIGS. 5a and 5b are partial radial cross-sectional views of the vanes of the segmented openings, as taking along lines 5a and 5b of FIG. 5;

FIG. 6 is a view similar to FIG. 5 but showing another embodiment of the invention; and FIG. 7 is a view similar to FIG. 5 but showing yet another embodiment of the invention.

DETAILED DESCRIPTION OF THE PREFERRED EMBODIMENT

Referring now more particularly to FIGS. 2-5, a combustor 10, preferably of annular configuration is disposed about an engine centerline 11 and generally includes a plenum or combustor case 12 having inner and outer casings 14,16. The diameter R of outer casing 16 in many instances will be a determinative factor of the overall diameter of the gas turbine engine. Combustor 10 further includes a combustor liner generally denoted by the numeral 18, again of annular configuration, with annularly shaped inner and outer liners 20,22. As depicted, the inner and outer casings 14,16 inner and outer liners 20,22 are concentrically arranged and extend axially.

The combustor plenum or case 12 receives pressurized airflow from the compressor suction of the engine through a diffuser 50, and one portion of the airflow passes through a domed end of the combustor liner, while other portions pass through outer and inner annulus spaces 15 and 17 to be delivered to the combustor chamber 19 define inside combustor liner 18. More particularly, the domed end of the combustor liner may include hemispherically shaped dome shrouds 24 defining an opening 26 therebetween for receiving primary pressurized airflow, along with a transverse endwall 28.

Figure 2:
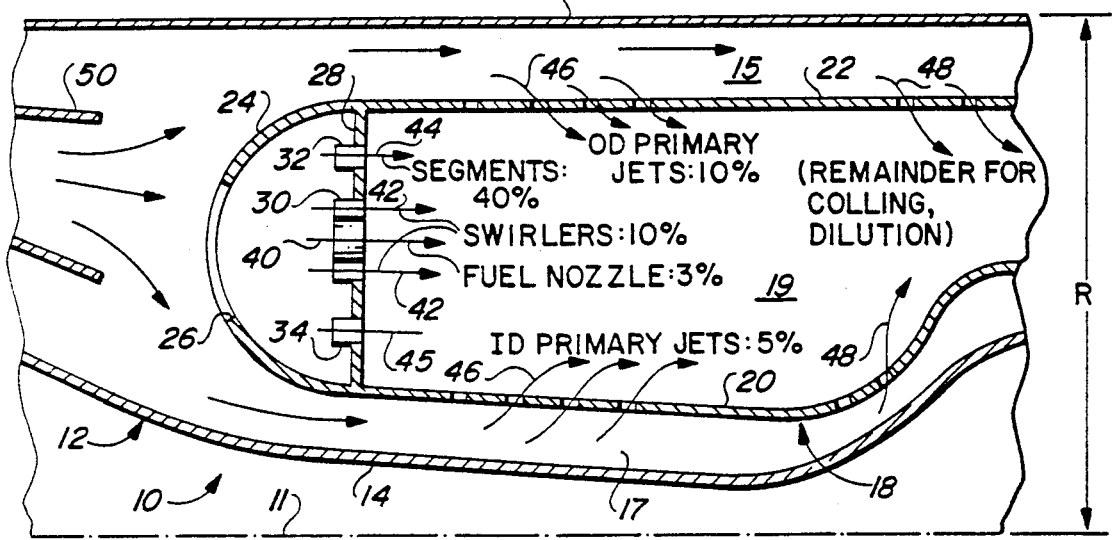
FIG. 2 is a view like FIG. 1 but as constructed in accordance with the principles of the present invention.
Figure 3:
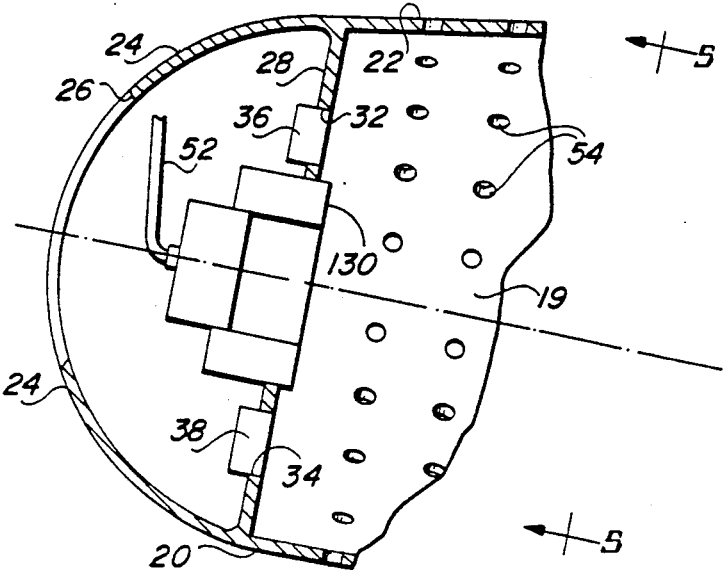
FIG. 3 is an enlarged, partial plan cross-sectional view of the dome section of the combustor liner.

Disposed circumferentially around endwall 28 are a plurality of regularly spaced air blast fuel nozzles, either typical fuel nozzles schematically illustrated at 30 in FIG. 2, or an improved radial, axial swirler 130 as depicted in FIGS. 3-5. The radial, axial swirler 130 is described in deta il in the copending patent application Ser. No. 08/052,416 referred to above, and is incorporated herein to the extent necessary for a complete understanding of the present invention. Suffice it to say that with either swirler 30 or 130, there is associated a fuel delivery nozzle 52 directing a stream of liquid fuel through the center of the nozzle 30, 130. The stream of fuel is atomized and initially mixed with primary airflow by virtue of the action of the air blast nozzle 30,130, and this atomized mixture of fuel and primary airflow is directed axially through the transverse wall 28 into the primary zone of the combustor chamber immediately axially downstream of the transverse interface 28. Primary airflow for support of the combustion chamber is also directed radially into the primary zone of the combustion chamber through perforations or orifices 54 in the inner and outer liners 20,22. This radial flow of primary air is depicted by arrows 46 in FIG. 3. Also, as illustrated by arrows 48 in FIG. 2, additional pressurized airflow for cooling and dilution purposes passes through the outer and inner annulus spaces 15,17 into the combustor chamber at a location axially downstream of the primary zone. Axial flow of primary air of the primary zone of the combustor chamber through the air blast nozzle is illustrated by arrows 40,42 in FIG. 2, respectively representing primary airflow directly associated with the central fuel nozzle, as well as swirling airflow 42 in the zone circumferentially surrounding and immediately adjacent the fuel nozzle.

The present invention further includes, in association with each of the air blast fuel nozzles 30 or 130. a first, radially outwardly located, arcuately shaped, segmented opening 32 disposed radially outwardly of the associated air blast fuel nozzle 130 in relation to the engine centerline 11. A similar arcuately segmented inner opening 34 in the dome end wall 28 is disposed radially inwardly of the associated fuel nozzle 130.

Disposed within and extending across the first or outer arcuately segmented opening 32 is a first set of inclined vanes 36. Across the second or inner segmented opening 34 are a second of set of vanes 38. Importantly, the vanes 36 and 38 are inclined oppositely relatively to one another. Thus, primary airflow passing through the first segmented opening 36 will be canted or in clined in the direction illustrated by arrow 44, while the primary airflow issuing from the second segment 34 will be inclined or canted in an opposite direction as illustrated by the arrow 45.

Importantly, the inclined vanes 36,38 together create a swirling supply of primary airflow passing axially into the primary zone of the combustion chamber in circumferentially surrounding relationship to the fuel air mixture issuing from each of the fuel nozzles 130. This swirling supply preferably coswirls in the same direction as the swirling airflow 42.

As best depicted in FIG. 5, the arcuately segmented openings 32,34 are formed as an arc of circles of equal radius. Additionally, it is important to note in FIG. 5 that the segmented openings 32, 34 are oppositely curved in relation to the engine centerline 11,i.e., convexly and concavely respectively configured as depicted in FIG. 5, to further promote swirling action of the primary airflows 44,45. Also, the segmented openings 32,34 have circumferential lengths greater than the diameter of their associated nozzle 130. In the embodiment illustrated in FIG. 5, the segmented openings 32,34 are circumferentially offset relative to one another and to a radial line 56 extending between the engine centerline 11 and the center of the associated nozzle 130. This circumferentially asymmetric positioning of the associated first and second arcuately segmented openings 32,34 tends to stretch the swirling flow pattern of primary air flow, as depicted in arrows 44,45 in a circumferential direction to reduce the volume magnitude of "non swirling" portions of primary air flow in the zones between adjacent fuel nozzles 130.

In operation, in addition to delivery of pressurized airflow from diffuser 50 through the airblast fuel nozzle 30,130, as well as via inner and outer annular spaces through the orifices 54 to the combustor chamber, the present invention further produces a significant axial flow of primary airflow through the first and second arcuately segmented openings 32,34. The axial airflows passing through segmented 32,34 are redirected angularly in opposite directions as discussed above by action of the first and second sets of opposite inclined vanes 36,38 to generate a swirling rotation of the primary airflow passing through arcuately segmented openings 32,34. This swirling action increases residence time of this primary air flow 44,45 because of the longer path it must traverse while dwelling in the primary zone. This increased residence time promotes and maintains flames stabilization even though the volume of axial flow passing through the dome end plate 38 is substantially greater than prior art structures. (This to be contrasted with the prior art arrangements which introduce certain flows through the transverse end walls for cooling and or dilution purposes rather than introduction of a major flow of primary air for support of combustion in the primary zone in the combustion.) At the same time this swirling primary airflow 44,45 enhances mixing and uniformity of the fuel air mixture, tends to enlarge the conical included angle of the atomized fuel air issuing from the fuel nozzle 130, all to promote a more uniform, complete combustion process.

It is important to note in this process that the segmented openings are separately associated with each of the separate fuel nozzles 130. Thus, the present invention establishes a swirling airflow associated with each individual fuel nozzle to create the necessary residence time and mixing required for the improved combustion process accomplished by the present invention. The present invention therefore provides an increased axial airflow through the dome endwall 28 while avoiding the problems associated with prior art arrangements by virtue of swirling nature of the flow introduced. That is, the present invention avoids increased thermal variation at the exit normally associated with increased axial flow into the combustor, yet still maintains flame stability in the primary zone.

Figure 1:
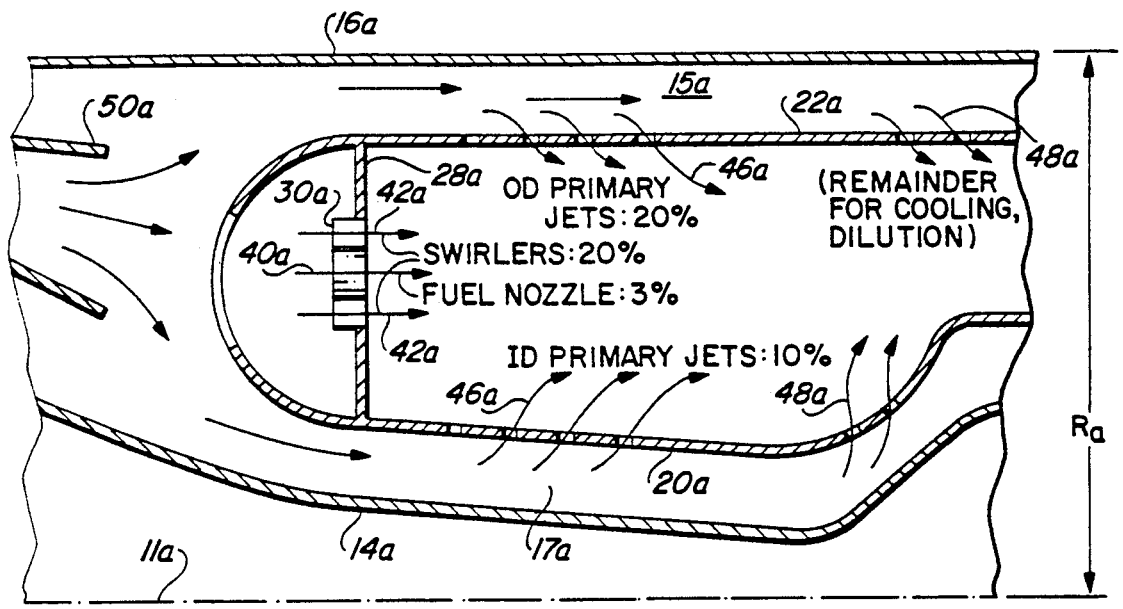
FIG. 1 is a schematic, plan cross-sectional view of a prior art gas turbine combustor.

The advantage of reduced overall combustor size can be appreciated by comparison of FIGS. 1 and 2 wherein the outer combustor diameter R of the present invention in FIG. 2 is less than the outer diameter $R_a$ of the prior art. In particular it can be seen that the swirling airflow 44,45 through the inner and outer arcuately segmented openings 32,34 may direct approximately 40% of the pressurized airflow into the combustion chamber 19. In combination with the airflow percentage passing through the air blast fuel nozzle 30, approximately 13% in total, it will be seen that the primary airflow passing through the outer liner 18 is reduced from approximately 20% in the prior art FIG. 1, to approximately 10% in the arrangement of FIG. 2. Similarly, the primary airflow passing through the inner liner 20 is reduced from approximately 10% to approximately 5%. As a result of the reduced airflow required to be carried by the annular spaces 15,17, they are smaller in size. This directly results in reduction of the overall diameter of the combustor and gas turbine engine.

An alternate arrangement for the segmented openings is illustrated in FIG. 6 wherein the outer arcuately segmented opening 132 and inner arcuately segmented opening 134 are curved in the same direction, are each concentrically arranged relatively to the engine centerline, and are symmetrically disposed about the radial line 56. The inner arcuately segmented opening 134 is formed on the arc of a circle of a smaller diameter that of the outer segmented opening 132. The arrangement in FIG. 6 is believed to provide adequate swirling action of the additional axial airflow 44,45, and may offer the advantage of reduced manufacturing costs.

Another arrangement is illustrated in FIG. 7 wherein the outer arcuately segmented opening 232 and inner arcuately segmented opening 234 are oppositely curved like illustrated in FIG. 5, but are symmetrically disposed about the radial line 56. Outer segmented opening 232 is formed on the arc of a circle concentric to the engine center line, and the inner segment 234 may be formed on the arc of a circle of the same diameter for manufacturability. However, because of the segment 234 is disposed radially inwardly, preferably its circumferential length is less than that of the outer arcuately segmented opening 232.

With respect to both FIGS. 6 and 7, the operation will be as set forth above with regard to FIGS. 2-5 to produce a combustor overall reduced diameter.

Various alterations and variations describe specific arrangements will be apparent to those skilled in the art. For example, the principles of the present invention may be readily applied to a cylindrical or can-type combustor rather than the annularly configured combustor illustrated. Accordingly, the foregoing of the detailed description of the preferred embodiment of the present invention should be considered as exemplary in nature and not as limiting to the scope and spirit of the invention as set forth in the appended claims.

Having the described the invention with sufficient clarity that those skilled in the art may make and use it, what is claimed is:

1. A gas turbine engine combustor comprising:
   an axially extending combustor case having an opening for receiving pressurized airflow;
   an axially extending combustor liner disposed within said case to define a combustion chamber within said liner and an air supply passage between said case and liner, said liner having a plurality of openings along the axial length thereof to deliver airflow to the combustion chamber;
   a dome closing the forward end of said liner, the opposite aft end of said liner being open for exit of hot gas to perform useful work, said dome having first and second arcuately segmented openings therein;
   an air blast fuel nozzle secured to said dome between said first and second segmented openings for delivery of atomized fuel-air mixture to a primary zone of the combustion chamber immediately downstream of said dome; and
   a first set of inclined vanes extending across said first segmented opening and a second set of oppositely inclined vanes extending across said second segmented opening, whereby a swirling supply of primary airflow is introduced into said primary zone in circumferentially surrounding relation to said fuel-air mixture.

2. A combustor as set forth in claim 1, wherein said first and second segmented openings are oppositely curved.

3. A combustor as set forth in claim 1, wherein said first and second segmented openings are curved in the same direction.

4. An annular gas turbine engine combustor comprising:
   an annular case having axially extending, concentric, inner and outer combustor casings extending circumferentially about the axis of the engine, said case receiving pressurized airflow through one axial end thereof;
   an annular combustor liner having perforated, axially extending, concentric, inner and outer liners within said case and extending circumferentially about the engine centerline, said inner and outer liners defining an annular combustion chamber therebetween receiving pressurized airflow through said perforations;
   a dome at one axial end of said lining for substantially closing said combustion chamber, the opposite axial end of said lining being open for exhaust of combustion gas products from the combustion chamber;
   a plurality of air blast fuel nozzles spaced circumferentially about and secured to said dome for delivery of atomized fuel-air mixture to a primary zone of the combustion chamber immediately downstream of said dome, said dome having separate first and second arcuately segmented openings associated with each of said nozzles; and
   a first set of inclined vanes extending across each of said first segmented openings, and a second set of oppositely inclined vanes extending across each of said second segmented openings, whereby a swirling supply of primary airflow is introduced into said primary zone in circumferentially surrounding relation to said fuel-air mixture issuing from each of said nozzles.

5. An annular combustor as set forth in claim 4, wherein said first and second segmented openings are curved in the same direction.

6. An annular combustor as set forth in claim 5, wherein each of said first and second segmented openings are disposed respectively radially inwardly and outwardly of their associated nozzle in relation to the engine centerline.

7. An annular combustor as set forth in claim 6, wherein said first and second segmented openings are formed on arcs concentric to the engine centerline.

8. An annular combustor as set forth in claim 7, wherein each of said first and second segmented openings have circumferential lengths longer than that of their associated nozzle.

9. An annular combustor as set forth in claim 4, wherein said first and second segmented openings are oppositely curved.

10. An annular combustor as set forth in claim 9, wherein each of said first and second segmented openings are disposed respectively radially inwardly and outwardly of their associated nozzle in relation to the engine centerline.

11. An annular combustor as set forth in claim 10, wherein each of said first and second segmented openings have circumferential lengths longer than that of their associated nozzle.

12. An annular combustor as set forth in claim 11, wherein each of said first and second segmented openings are disposed circumferentially symmetric to a radial line between the engine centerline and the center of the associated nozzle.

13. An annular combustor as set forth in claim 11, wherein each of said first and second segmented openings are disposed circumferentially asymmetric to a radial line between the engine centerline and the center of the associated nozzle.

14. An annular combustor as set forth in claim 13, wherein said first and second segmented openings are offset circumferentially in opposite directions relative to said radial line.

15. An annular combustor as set forth in claim 10, wherein said first and second arcuately segmented openings are formed on arcs concentric to the engine centerline axis.

16. An annular combustion as set forth in claim 10 wherein said second segmented openings are formed on arcs of equal radius to said first segmented openings.

17. An annular combustor as set forth in claim 4, further including a circular swirler closely surrounding each of said nozzles for directing another supply of primary airflow swirling in a direction complementary to the direction of swirl created by said first and second sets of vanes.

* * * * *